May 26, 1931.  G. KRELL  1,806,944
PIPE CLAMP
Filed Oct. 7, 1929  5 Sheets-Sheet 2

May 26, 1931.  G. KRELL  1,806,944
PIPE CLAMP
Filed Oct. 7, 1929    5 Sheets-Sheet 3

INVENTOR
George Krell
BY Arthur E. Brown
ATTORNEY

May 26, 1931.  G. KRELL  1,806,944
PIPE CLAMP
Filed Oct. 7, 1929  5 Sheets-Sheet 4

INVENTOR
George Krell
BY Arthur E. Crown
ATTORNEY

May 26, 1931. G. KRELL 1,806,944
PIPE CLAMP
Filed Oct. 7, 1929  5 Sheets-Sheet 5
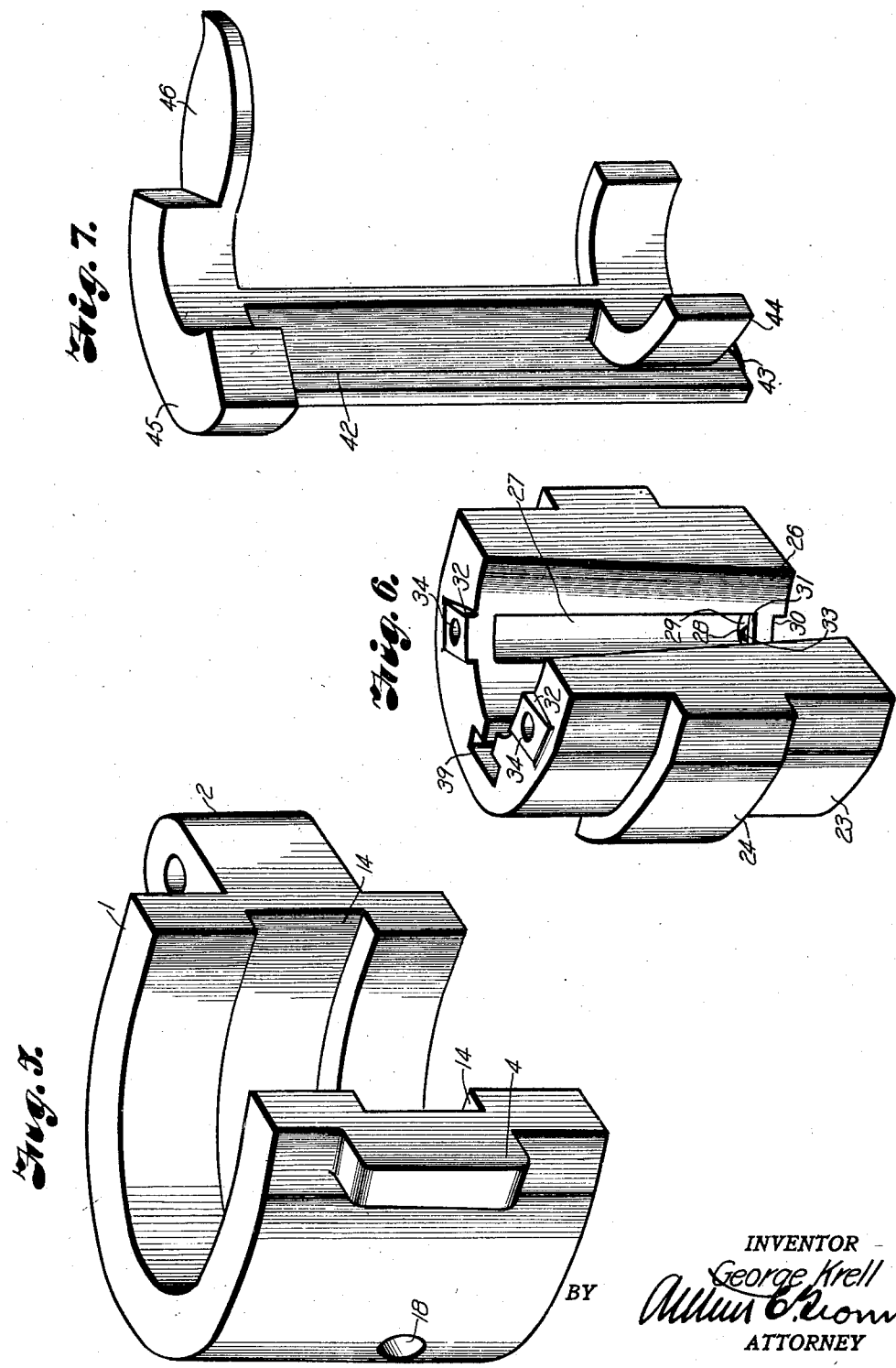
INVENTOR
George Krell
BY
ATTORNEY Patented May 26, 1931

1,806,944

UNITED STATES PATENT OFFICE

GEORGE KRELL, OF SAPULPA, OKLAHOMA

PIPE CLAMP

Application filed October 7, 1929. Serial No. 397,901.

My invention relates to clamps, and more particularly to clamps of the slip type for letting in or removing tubing or casing to or from an oil well, the principal object of the invention being to adapt the clamp for use with longer bails or in lower derricks than is possible with the present clamp of this type.

In accomplishing this object, I mount the slips in carriers movable laterally to initial set position in response to initial upward movement of the bails and then effect the gripping relation between the slips and pipe through shift of the slips in the carriers in response to contact of the slip mechanism with a coupling collar on the pipe, thereby gaining an advantage in length of the bails or height of the derrick, corresponding to the saving in vertical movement effected by initial setting of the carriers before the clamp starts its upward movement through lift of the bails.

In the accompanying drawings:—

Fig. 5 is a detail perspective view of one of the frame members.

Fig. 6 is a detail perspective view of one of the slip carriers.

Fig. 7 is a detail perspective view of one of the slip setting devices.

Figure 1:
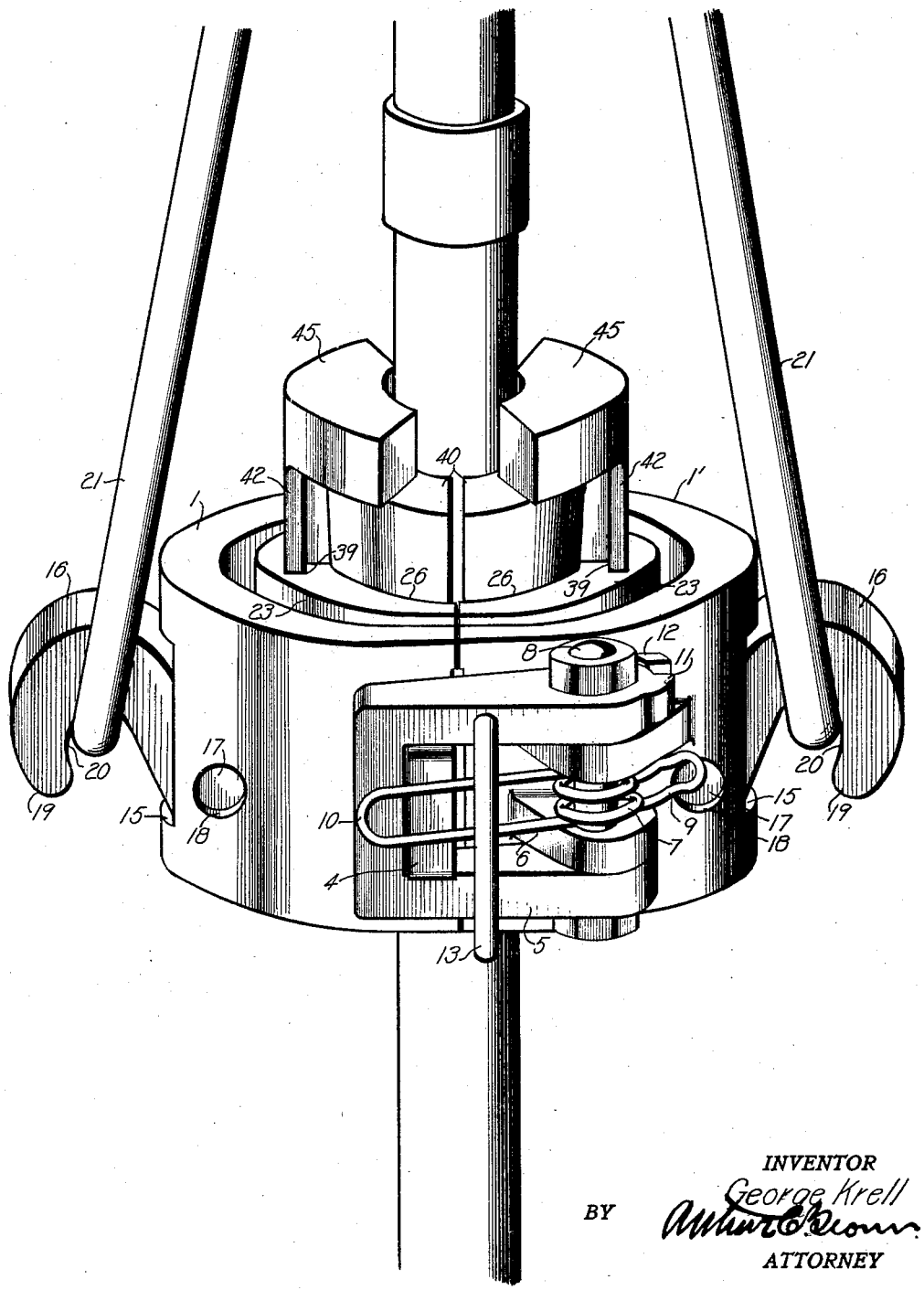
Fig. 1 is a perspective view of a clamp embodying my improvements applied to well tubing.
Figure 2:
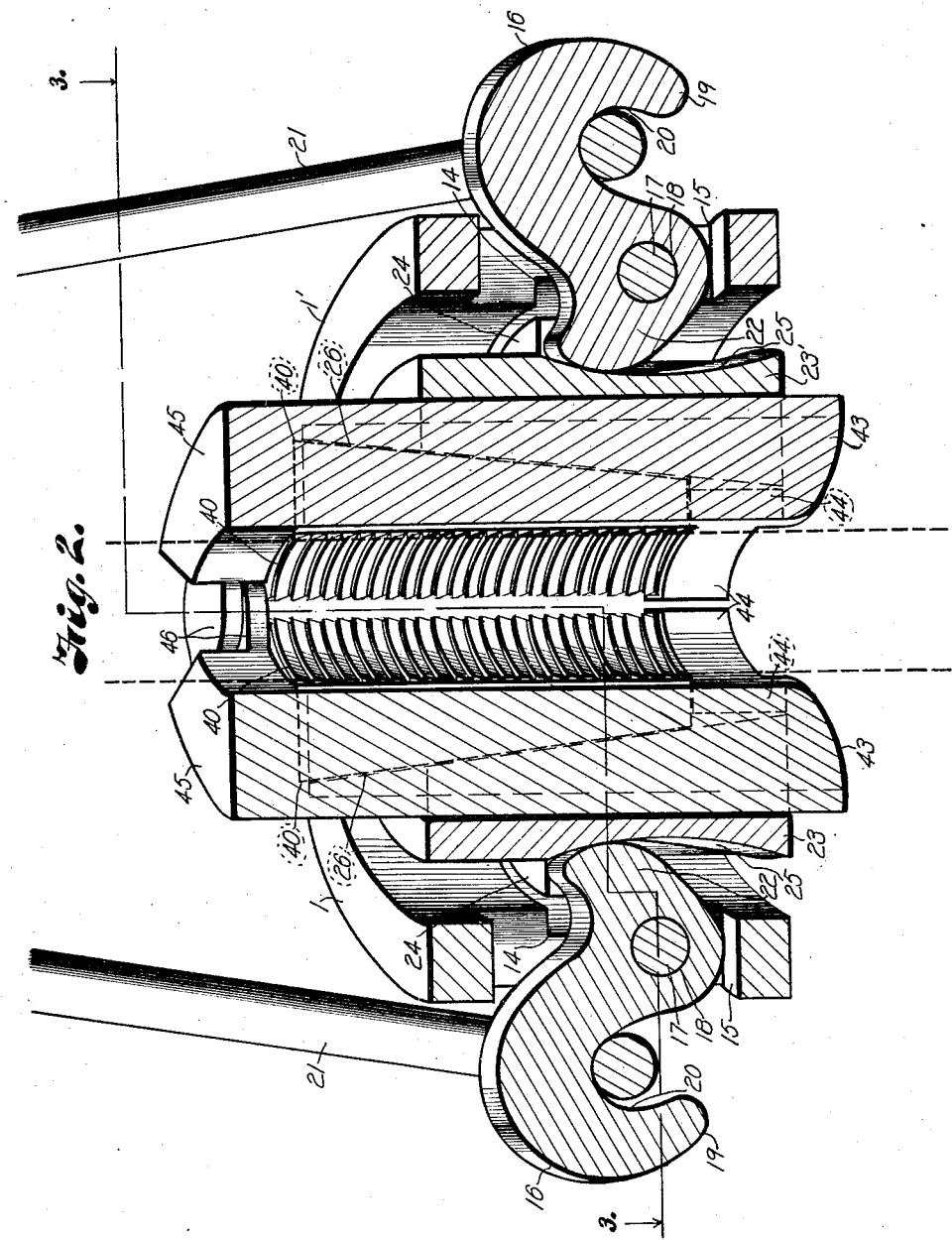
Fig. 2 is a central, vertical section of the clamp.
Figure 3:
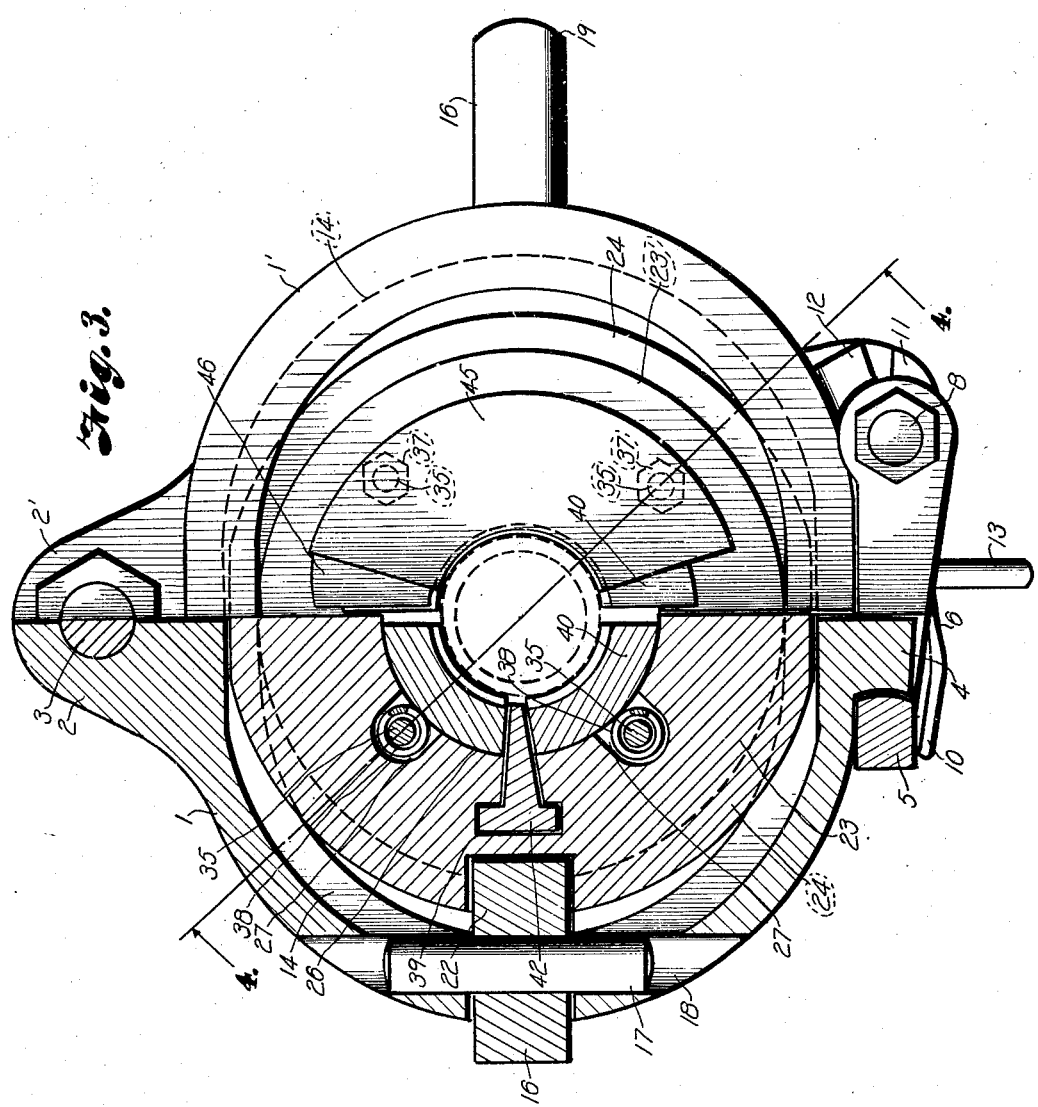
Fig. 3 is a view of the clamp partly in plan and partly in horizontal section on the line 3—3, Fig. 2.
Figure 4:
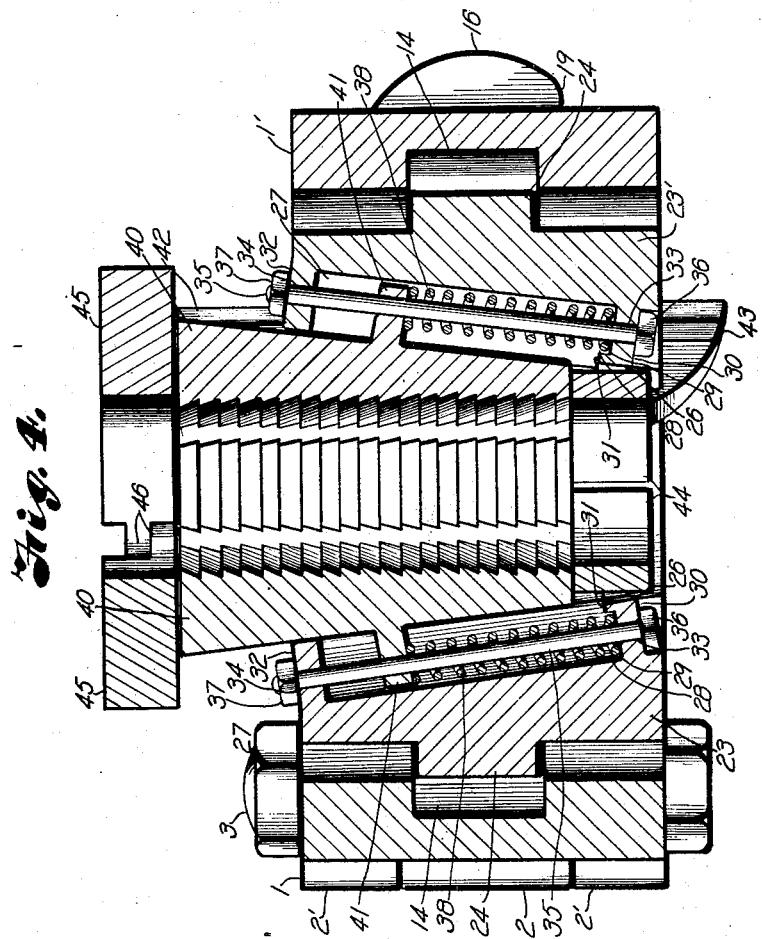
Fig. 4 is a vertical section on the line 4—4, Fig. 3.

Referring in detail to the drawings:

1—1' designate paired frame members, preferably of semi-elliptical form, having mating lugs 2—2' at their rear edges, connected by a pin 3 for hinging the members together and having one a latch lug 4 and the other a latch yoke 5 at its forward edge for latching the members in closed relation. 6 designates a latch spring including a loop 7 on the yoke pin 8, a tail 9 bearing against the frame member 1' and an arm 10 bearing against the yoke. 11 designates a stop on one of the yoke arms, engageable with a boss 12 on the face of the frame member 1', and 13 a handle member on the latch yoke whereby the yoke is swung on its pivot against the tension of spring 6 to unlatch the frame and whereby the frame may be opened by further pull on the handle after the stop 11 has engaged the boss 12. The spring automatically returns the yoke to latching position when the handle is released.

14 designates grooves in the inner faces of the frame members for a purpose presently described, and 15 slots in the ends of the frame members within which bail hooks 16 are pivotally mounted on pins 17 fitted in openings 18 in the frame members. Each of the hooks 16 includes an outer, downturned hook end 19 providing a rolling seat 20 for a supporting bail 21, and an inner cam end 22 for engaging one of a pair of slip carriers 23—23'.

Each of the slip carriers 23—23' is preferably semi-circular in cross section to fit snugly and and have sliding movement within a corresponding frame member and has a guide rib 24 on its outer face seated in the groove 14 of its frame member to permit horizontal and prevent vertical movement of the carrier member in the frame member, and each carrier member has an arcuate socket 25 in its outer face and extending through the rib 24 for seating the cam 22 of a bail hook 16.

Each of the carrier members 23—23' has a downwardly tapered bore portion 26, provided in its wall with vertical grooves 27 and in its bottom face with recesses 28 beneath the grooves, forming spring seats 29 and bolt head sockets 30, the seats 29 being inclined to lie at a right angle to the tapered wall of the carrier bore and having upstanding keeper lips 31, and the upper edge of the carrier member having built up bosses 32 inclined on their upper faces to parallel the spring seats. Extending through apertures 33 and 34 in the spring seats 29 and built up bosses 32 are bolts 35 having heads 36 seated in the sockets 30 and nuts 37 seated on the inclined faces of the bosses 32. Surrounding the bolts within the grooves 27 and seated on the seats 29 are coil springs 38 for a purpose presently described.

In the back center of each of the slip carrier members 23—23' and extending vertically therethrough is a T slot 39, the body of which opens to the bore of its carrier member. The vertical grooves 27 are preferably located equidistant from the slot 39 and the edges of the carrier member for a purpose presently described.

40 designates slips having straight wickered inner faces and tapered outer faces adapted to open and close in response to vertical movement in their carrier members in accordance with common practice and having angling lugs 41 extended into the grooves 27, slidably mounted on the bolts 35, and bearing on the tops of the springs 38 so that the slips are, by the springs, yieldingly held in elevated open position.

Slidable in the T slots 39 are the T shaped bodies 42 of slip setting devices 43, having arcuate base arms 44 at their lower ends located within the carrier bores beneath the slips and adapted to extend below the carrier members under the conditions and for the purpose presently described.

The slips and the bodies of the setting devices extend above the carriers and the bodies of the said devices have arcuate heads 45 overlying the slips to confine the slips between the base and the head members of the setting devices. The ends of the heads 45 at the hinged end of the completed structure have overlying ears 46 curved inwardly to project interiorly of the slip bore when the clamp is opened and thereby protect the slip wickers from damaging contact by tubing over which the clamp is applied, and to exclude the tubing from the hinge joint when the clamp is being set in the tubing.

The slip carriers 23—23' are of such dimensions as to contact at their inner vertical edges prior to contact of the slips with the pipe, when moved laterally by the bail actuated cams, thereby effecting the initial setting of the slip so that a slight vertical movement of the slips will insure the gripping contact with the pipe, and the gripping relation is maintained and enhanced by translation of weight of the clamp and its load into thrust of the slips against the pipe through the cam mechanism.

With the parts constructed and assembled as described when the clamp is to be applied to pipe, such as well tubing or casing, the frame members are opened on their hinge and moved over and closed onto the pipe.

The clamp being suspended from the bails by the bail hooks, weight of the parts induces a cam action of the bail hooks on the slip carriers, tending to move the slip carriers inwardly toward each other and locate the slips in circular assembly about the pipe. The frame members are then latched together and the clamp moved upwardly along the pipe by lift of the bails, but without contact of the wickers on the slips with the surface of the pipe, the slips being retained in upwardly spaced relation by the springs 38. When, in such upward movement, the heads of the slip setting devices contact a coupling collar on the pipe, the slips are held by such contact and, the balance of the clamp continuing the upward movement, the tapered walls of the slip carriers move the slips against the pipe so that the pipe is held securely by the slips and may be carried by the clamp to and into or from the well in accordance with common practice.

When the pipe is lowered onto the derrick floor or onto other pipe in the well, the clamp is relieved of weight of the pipe and tends to move downwardly along the pipe, opening the slips so that the clamp may be unlatched and removed from the pipe.

What I claim and desire to secure by Letters Patent is:

1. A clamp of the character described, including elevating means, slip carriers operably connected with the elevating means for lateral movement in response to initial vertical movement of said means and slips movably mounted in the carriers.

2. A clamp of the character described, including elevating means, slip carriers operably connected with the elevating means for limited lateral movement in response to initial vertical movement of said means and slips movably mounted in the carriers.

3. A clamp of the character described, including elevating means, slip carriers having lateral movement in response to initial vertical movement of said means, slips movably mounted in the carriers, and means yieldingly urging the slips to open position in the carriers.

4. A clamp of the character described, including elevating means, slip carriers operably connected with the elevating means for lateral movement in response to initial vertical movement of the elevating means, slips movably mounted in the carriers, means yieldingly urging the slips to open position in the carriers, and means engageable with a protuberance on the pipe to be engaged by the slips for shifting the slips upon lift of the clamp responsive to continued vertical movement of said elevating means.

5. A clamp of the character described, including a frame, slip carriers keyed to the frame for lateral opening and closing movement therein, elevating means operable to first close the carriers and then lift the frame, and slip mechanism normally yieldingly retained in open position and engageable with a protuberance on a pipe for shifting said mechanism to gripping relation with the pipe.

6. A clamp of the character described, including a frame, slip carriers slidably mounted in the frame, cams on the frame and engaging the carriers, hanger bails cooperative with the carriers to support the frame and effect sliding movement of the carriers in response to initial vertical movement of the bails and lift of the frame in response to continued vertical movement of the bails, slips in said carriers, means normally urging the slips to open position, and means engageable with a protuberance on a pipe for shifting the slips to gripping relation with the pipe.

7. A clamp of the character described, including hingedly connected frame members having laterally enlongated interior chambers provided with transverse guide grooves, slip carriers complementary to the frame members having ribs slidable in said guide grooves to key the carriers to the frame members, cam members mounted on the frame members engageable with the carriers and having bail hooks at their outer ends, bails engaging said hooks to first shift the carriers and then lift the frame when the bails are raised, and slips in said carriers.

8. A clamp of the character described, including a frame, slip carriers in said frame, slips in and anchored to said carriers, and slip setting devices keyed to the carriers and engageable with a protuberance on a pipe enclosed by the slips to shift the slips to gripping relation with the pipe.

9. A clamp of the character described, including a frame, slip carriers in said frame, slips in said carriers, slip setting devices keyed for vertical movement in the carriers, having head and base portions engaging opposite ends of the slips, the head portions being engageable with a protuberance on the pipe to shift the slips in the carriers.

10. A clamp of the character described, including hingedly connected frame members, slip carriers slidable in the frame members, slips in said carriers, slip setting devices slidable in said carriers having heads engageable with a protuberance on a pipe to shift the slips, and having arms shaped to extend into the clamp when the clamp is opened for the purpose set forth.

11. A clamp of the character described, including elevating means, slip carriers operably connected with the elevating means having lateral movement in response to vertical movement of the elevating means, slips movably mounted in the carriers, and slip setting devices engageable with a protuberance on a pipe to shift the slips to gripping elevation with the pipe.

In testimony whereof I affix my signature.

GEORGE KRELL.